(12) United States Patent
Nakamori

(10) Patent No.: US 11,586,405 B2
(45) Date of Patent: Feb. 21, 2023

(54) PRINTING CONTROL APPARATUS AND NON-TRANSITORY COMPUTER READABLE MEDIUM

(71) Applicant: FUJIFILM BUSINESS INNOVATION CORP., Tokyo (JP)

(72) Inventor: Yuki Nakamori, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/176,314

(22) Filed: Feb. 16, 2021

(65) Prior Publication Data
US 2022/0035590 A1    Feb. 3, 2022

(30) Foreign Application Priority Data

Jul. 29, 2020    (JP) .............................. JP2020-128271

(51) Int. Cl.
*G06F 3/12* (2006.01)
(52) U.S. Cl.
CPC .......... *G06F 3/1292* (2013.01); *G06F 3/1204* (2013.01); *G06F 3/1205* (2013.01); *G06F 3/1253* (2013.01)

(58) Field of Classification Search
None
See application file for complete search history.

(56) References Cited

U.S. PATENT DOCUMENTS

| | | | |
|---|---|---|---|
| 2015/0058419 A1 | 2/2015 | Tai | |
| 2019/0294394 A1* | 9/2019 | Oikawa | G06F 3/1228 |
| 2021/0006519 A1* | 1/2021 | Taitz | G06T 11/60 |

FOREIGN PATENT DOCUMENTS

| | | |
|---|---|---|
| JP | 6314824 B2 | 4/2018 |
| JP | 2019-135658 A | 8/2019 |
| JP | 2020046856 A * | 3/2020 |

* cited by examiner

*Primary Examiner* — Fan Zhang
(74) *Attorney, Agent, or Firm* — Oliff PLC

(57) ABSTRACT

A printing control apparatus includes a processor configured to obtain plural pieces of data posted in a group in a messaging service, and perform control in such a way as to print a certain one of the plural pieces of data according to a certain member of the group.

18 Claims, 14 Drawing Sheets

FIG. 7

| GROUP ID | RESERVATION No. | BOT JOINING TIME |
|---|---|---|
| Group-dshrap1 | AS98XM1P | 04/06/2019 11:22 |
| Group-wger3d2 | 458YK06J | 05/20/2019 22:10 |
| Group-runc9v4 | AS98XM1PB | 11/11/2019 21:33 |
| ... | ... | ... |

FIG. 8

| GROUP ID | USER ID | GROUP JOINING TIME | GROUP LEAVING TIME |
|---|---|---|---|
| Group-dshrap1 | U001a | 04/06/2019 11:22 | |
| Group-dshrap1 | U002b | 04/10/2019 16:32 | |
| Group-dshrap1 | U003c | 04/15/2019 22:06 | |
| Group-wger3d2 | U002b | 05/21/2019 1:03 | |
| ... | ... | ... | ... |

FIG. 9

| USER ID | TERMS OF USE AGREEMENT TIME |
|---------|------------------------------|
| U001a   | 04/06/2019 11:24             |
| U002b   | 04/10/2019 16:34             |
| U003c   |                              |
| ...     | ...                          |

FIG. 10

| FILE ID | FILE NAME | RESERVATION No. | POSTING TIME | USER ID | REGISTRATION RESULT |
|---|---|---|---|---|---|
| Doc-111123 | IMG_20190406.jpg | AS98XM1P | 04/05/2019 14:02 | U001a | SUCCESSFULLY COMPLETED |
| Doc-124583 | report.pdf | AS98XM1P | 04/12/2019 13:21 | U001a | SUCCESSFULLY COMPLETED |
| Doc-345621 | IMG_2019aggre.jpg | 458YK06J | 05/23/2019 11:22 | U002b | SUCCESSFULLY COMPLETED |
| ... | ... | ... | ... | ... | ... |

FIG. 11

| RESERVATION No. | FILE ID | SHEET SIZE | COLOR TYPE | DOUBLE-SIDED | No. OF COPIES | FEE |
|---|---|---|---|---|---|---|
| AS98XM1P | Doc-124583 | A4 | COLOR | YES | 2 | 40 |
| 458YK06J | Doc-345621 | A4 | COLOR | NO | 1 | 20 |
| ... | ... | ... | ... | ... | ... | ... |

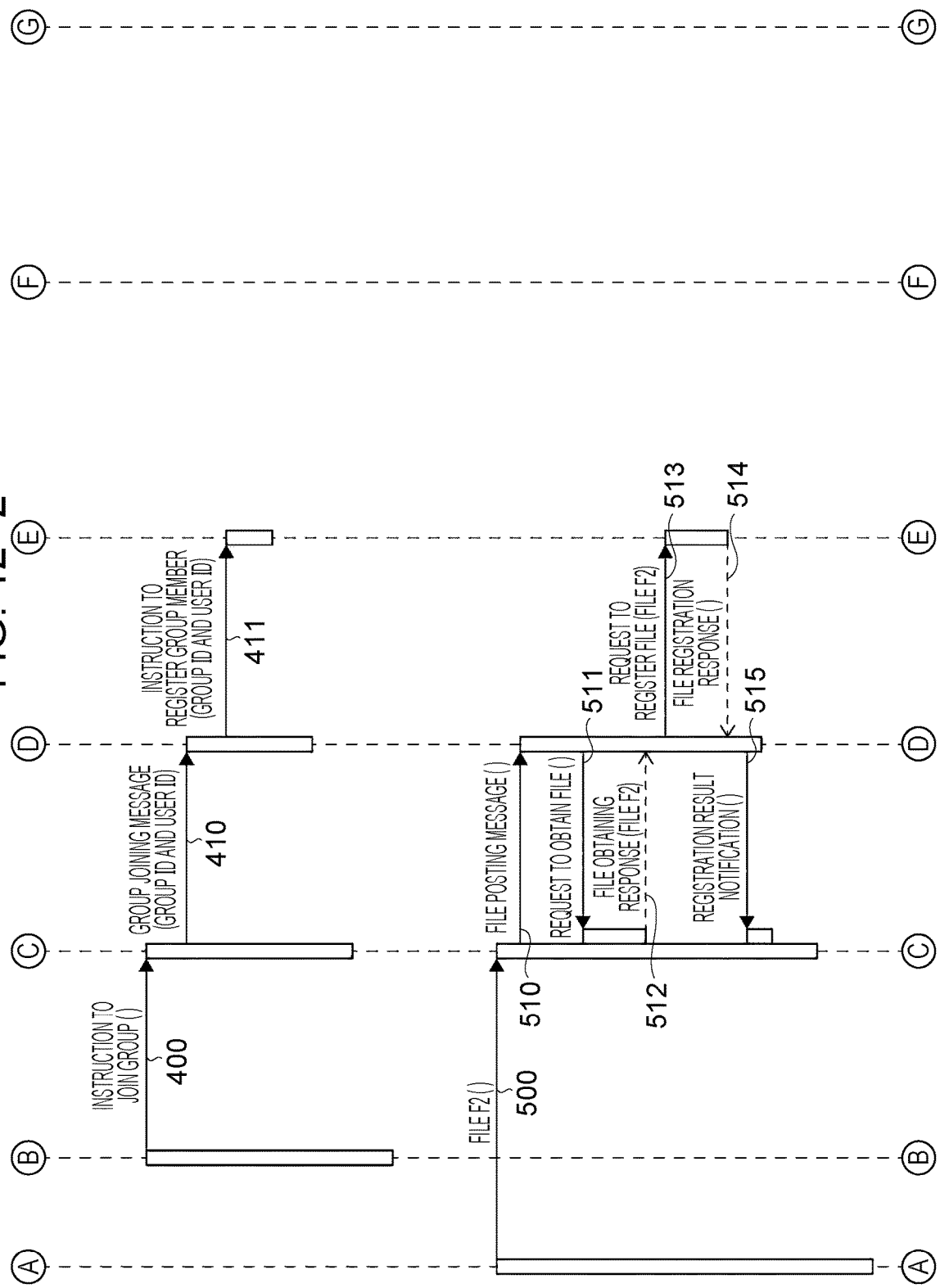

PRINTING CONTROL APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-128271 filed Jul. 29, 2020.

BACKGROUND

(i) Technical Field

The present disclosure relates to a printing control apparatus and a non-transitory computer readable medium

(ii) Related Art

A printing service server is known that automatically selects image data which has been posted by a social networking service (SNS) user and which is estimated to be likely to be printed, that automatically registers the selected image data, and that notifies the SNS user of a reservation number for the image data (e.g., refer to Japanese Unexamined Patent Application Publication No. 2019-135658).

A service apparatus is known that, in response to a data access request transmitted from a user terminal, refers to a time at which data has been transmitted from a terminal used by a person who has posted the data and a viewing period set in user identification information included in the data access request and that, if the viewing period includes the time, transmits the data transmitted at the time to the user terminal (e.g., refer to Japanese Patent No. 6314824).

Summary

Plural pieces of data posted in a group in a messaging service night be printed. When, in this case, a configuration is employed in which data that has been posted by a certain user and that is estimated to be likely to be printed is selected or a configuration is employed in which data posted by a certain user is printed if a viewing period set by a vi ewer includes a time at which the data has been posted, for example, it is difficult to print only data according to a certain member of the group.

Aspects of non-limiting embodiments of the present disclosure relate to making it possible to print only data according to a certain member of a group in a messaging service among plural pieces of data posted in the group.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a printing control apparatus including a processor configured to obtain plural pieces of data posted in a group in a messaging service, and perform control in such a way as to print a certain one of the plural pieces of data according to a certain member of the group.

BRIEF DESCRIPTION OF THE DRAWINGS

An exemplary embodiment of the present disclosure will be described in detail based on the following figures, wherein:

FIG. 7 is a diagram illustrating a specific example of a group table stored in a database of the printing server according to the exemplary embodiment of the present disclosure;

FIG. 8 is a diagram illustrating a specific example of a group member table stored in the database of the printing server according to the exemplary embodiment of the present disclosure;

FIG. 9 is a diagram illustrating a specific example of a user table stored in the database of the printing server according to the exemplary embodiment of the present disclosure;

FIG. 10 is a diagram illustrating a specific example of a file management table stored in the database of the printing server according to the exemplary embodiment of the present disclosure;

FIG. 11 is a diagram illustrating a specific example of a printing record management table stored in the database of the printing server according to the exemplary embodiment of the present disclosure;

FIG. 12-1 is a sequence diagram illustrating an example of the operation of the printing system according to the exemplary embodiment of the present disclosure;

FIG. 12-2 is a sequence diagram illustrating the example of the operation of the printing system according to the exemplary embodiment of the present disclosure; and FIG. 12-3 is a sequence diagram illustrating the example of the operation of the printing system according to the exemplary embodiment of the present disclosure.

DETAILED DESCRIPTION

An exemplary embodiment of the present disclosure will be described in detail hereinafter with reference to the accompanying drawings.

Figure 1:
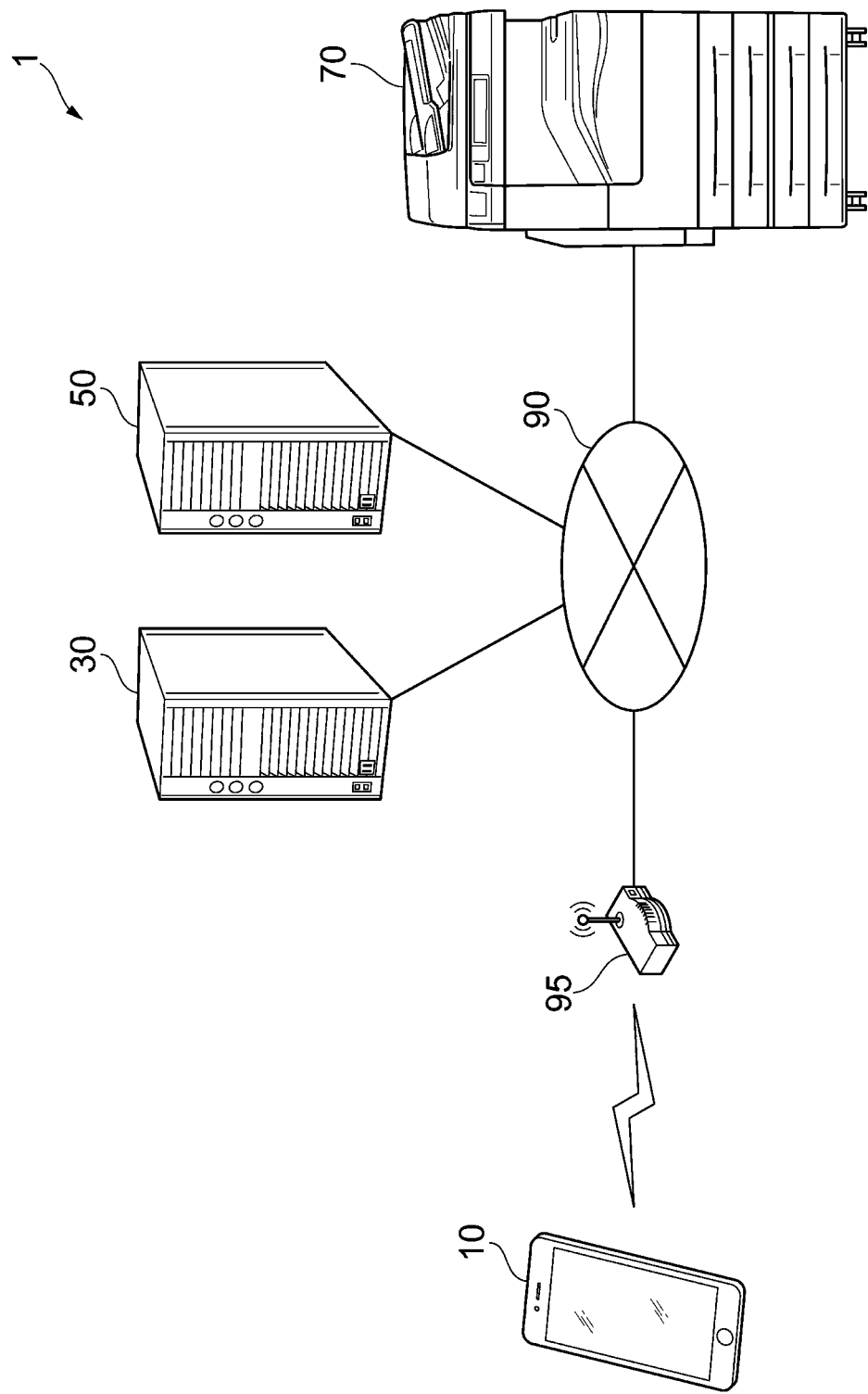
FIG. 1 is a diagram illustrating an example of the overall configuration of a printing system to which an exemplary embodiment of the present disclosure is applied.

Overall Configuration of Printing System FIG. 1 is a diagram illustrating an example of the overall configuration of a printing system 1 to which the present exemplary embodiment is applied. As illustrated in FIG. 1, the printing system 1 includes a mobile terminal 10, a messaging server 30, a printing server 50, and an image processing apparatus 70. The mobile terminal 10 can be wirelessly connected to a communication network 90 via an access point 95 using a wireless connection technology such as Wi-Fi (registered trademark). The messaging server 30, the printing server 50, and the image processing apparatus 70 are connected to the communication network 90.

The mobile terminal 10 is a terminal apparatus used by a user who uses the printing system 1. An application (a messaging service app) for providing a messaging service is installed on the mobile terminal 10. The messaging service refers to a service for enabling, when installed on the mobile terminal 10 by the user, the user to communicate instant messages with other users. The messaging service enables the user to communicate instant messages with another user by, for example, displaying messages input by the user of the mobile terminal 10 and the other user in a virtually provided chat room on a display of the mobile terminal 10 as if a conversation is taking place. The mobile terminal 10 may be, for example, a smart phone.

Although FIG. 1 illustrates only one mobile terminal 10, plural mobile terminals 10 may exist, instead. In the following description, a mobile terminal 10 used by user A will be referred to as a "mobile terminal 10a", and a mobile terminal 10 used by user B will be referred to as a "mobile terminal 10b".

The messaging server 30 is a server computer that provides the above-described messaging service in response to a request transmitted by the user from the mobile terminal 10. The messaging server 30 may be, for example, a general-purpose personal computer.

The printing server 50 is a server computer that provides a printing service for printing files posted by the user in the chat room of the messaging service displayed on the mobile terminal 10. More specifically, the printing server 50 registers, in response to a request transmitted by the user from the messaging server 30 using the mobile terminal 10, a file posted in the chat room of the messaging service displayed on the mobile terminal 10 as a file to be printed. The printing server 50 then transmits, in response to a request transmitted by the user from the image processing apparatus 70, the file to be printed to the image processing apparatus 70 as print data. Although files are printed in the follow ng description, the files include not only document files but also images and the like. The printing server 50 may be, for example, the general-purpose personal computer. In the present exemplary embodiment, the printing server 50 is an example of a printing control apparatus.

The image processing apparatus 70 is an apparatus that performs image processing such as formation of images on a recording medium such as sheets of paper, reading of images from a recording medium such as sheets of paper, transmission of images to public networks, and reception of images from public networks. The image processing apparatus 70, however, may perform at least one of these. For example, when the image processing apparatus 70 only forms images, the image processing apparatus 70 is a printer. When the image processing apparatus 70 only reads images, the image processing apparatus 70 is a scanner. When the image processing apparatus 70 only reads and forms images, the image processing apparatus 70 is a copier. When the image processing apparatus 70 only reads images and transmit images or receives images and forms images, the image processing apparatus 70 is a fax machine. Although FIG. 1 illustrates only one image processing apparatus 70, plural image processing apparatus 70 may exist, instead.

The communication network 90 is communication means used to communicate information, for example, between the mobile terminal 10, the messaging server 30, and the printing server 50, between the messaging server 30 and the printing server 50, or between the printing server 50 and the image processing apparatus 70. The communication network 90 may be, for example, the Internet.

Hardware Configuration of Mobile Terminal

Figure 2:
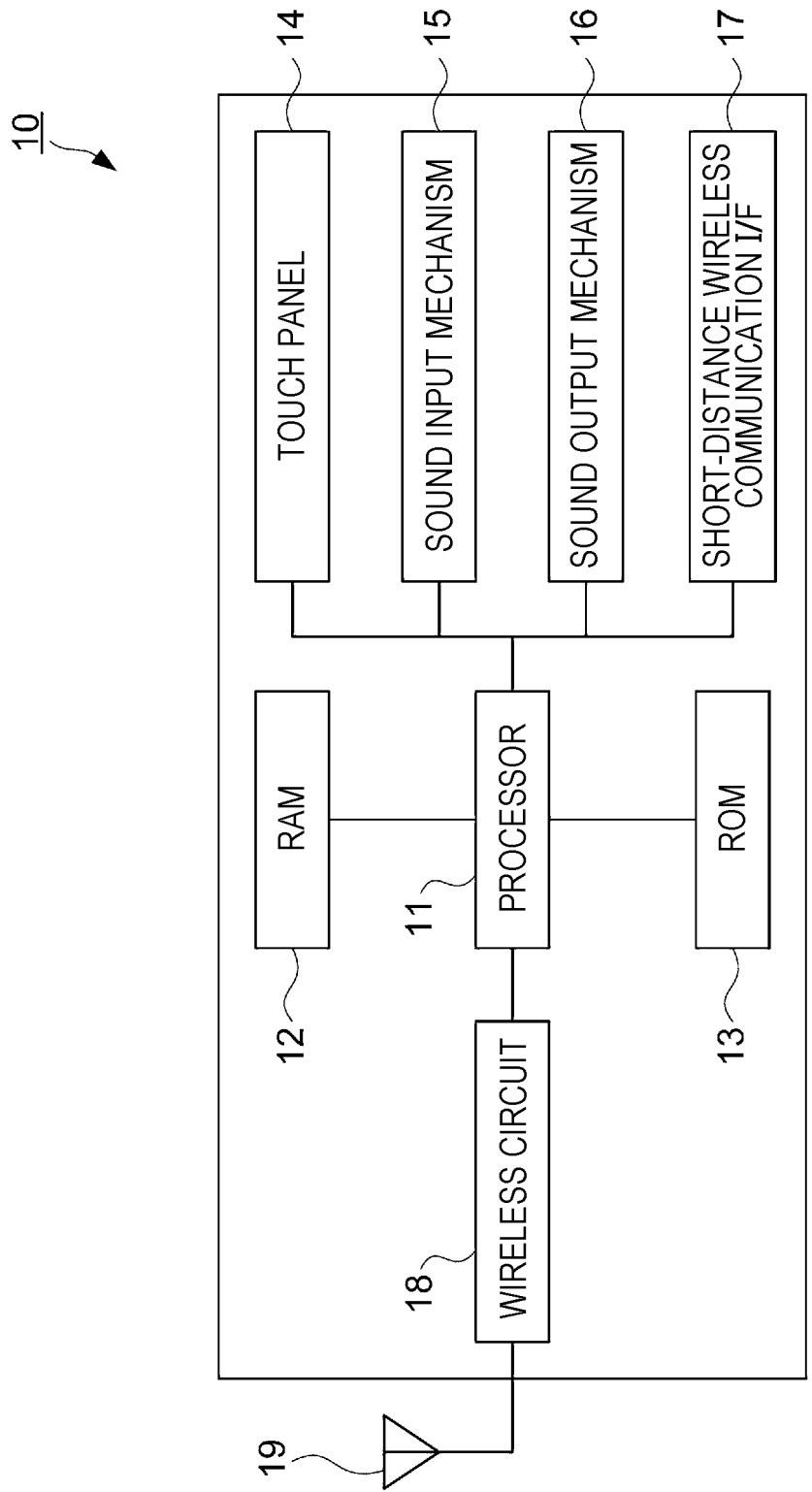
FIG. 2 is a diagram illustrating an example of the hardware configuration of a mobile terminal according to the exemplary embodiment of the present disclosure.

FIG. 2 is a diagram illustrating an example of the hardware configuration of the mobile terminal 10 according to the present exemplary embodiment. As illustrated in FIG. 2, the mobile terminal 10 includes a processor 11, which is processing means, a random access memory (RAM 12 and a read-only memory (RON) 13, which are storage means, a touch panel 14, which displays various pieces of information and receives operations input by the user, a sound input mechanism 15, such as a microphone, a sound out put mechanism 16, such as a speaker, and a short-distance wireless communication interface (I/F) 17, which communicates various pieces of information with the image processing apparatus 70 through short-distance wireless communication such as near-field communication (NFC). The mobile terminal 10 also includes a wireless circuit 18 and an antenna 19 for performing wireless communication via a base station. Although not illustrated, the wireless circuit 18 includes a baseband large-scale integration (LSI) circuit that processes signals of wirelessly communicated digital data.

Hardware Configuration of Printing Server

Figure 3:
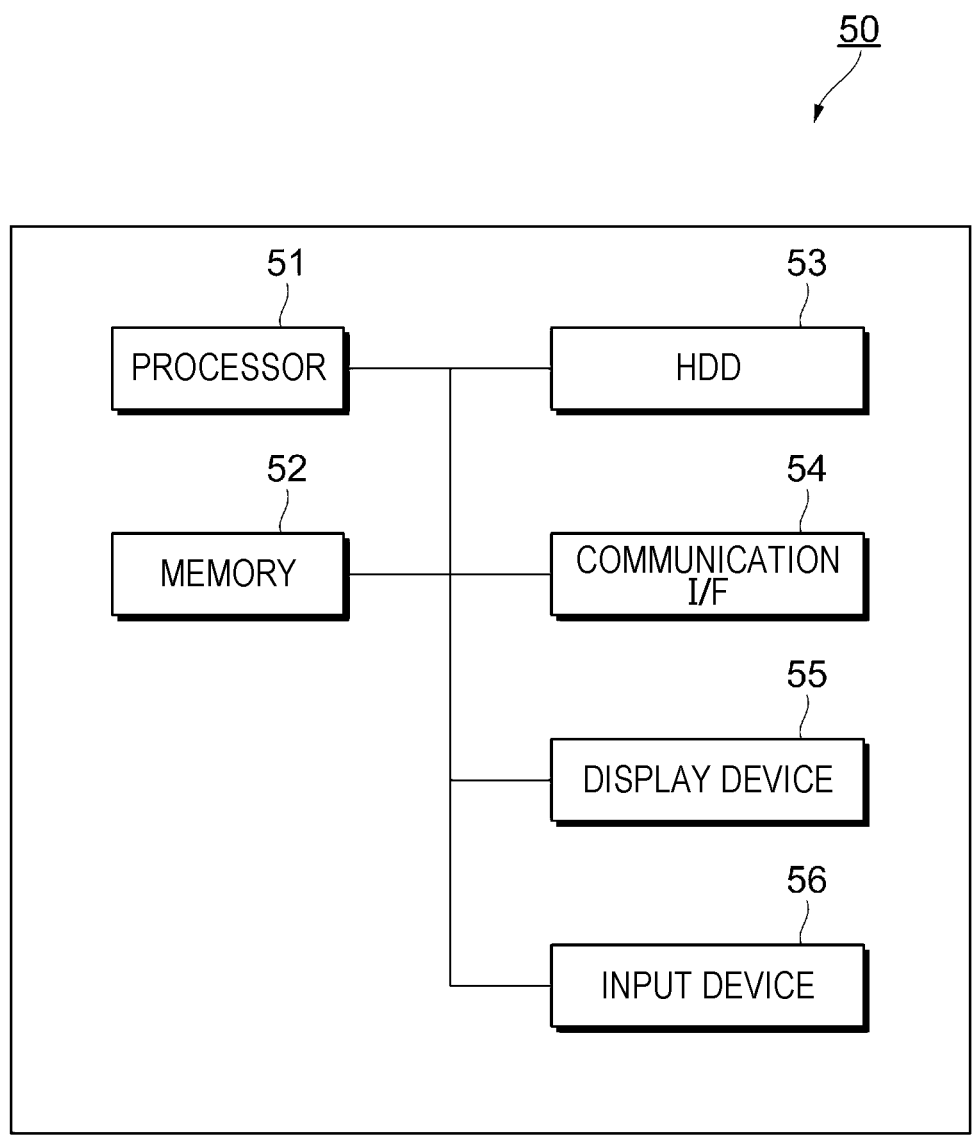
FIG. 3 is a diagram illustrating an example of the hardware configuration of a printing server according to the exemplary embodiment of the present disclosure.

FIG. 3 is a diagram illustrating an example of the hardware configuration of the printing server 50 according to the present exemplary embodiment. As illustrated in FIG. 3, the printing server 50 includes a processor 51, which is processing means, and a memory 52 and a hard disk drive (HDD) 53, which are storage means. The processor 51 executes various pieces of software such as an operating system (OS) and applications in order to achieve functions that will be described later. The memory 52 is a storage area storing, for example, the various pieces of software and data to be used to execute the various pieces of software, and the HDD 53 is a storage area storing, for example, data input to and output from the various pieces of software. The printing server 50 also includes a communication I/F 54 for communicating with the outside, a display device 55 such as a display, and an input device 56 such as a keyboard and a rouse.

The hardware configuration illustrated in FIG. 3 can also be seen as the hardware configuration of the messaging server 30. In the case of the messaging server 30, however, the processor 51, the memory 52, the HDD 53, the communication I/F 54, the display device 55, and the input device 56 illustrated in FIG. 3 will be referred to as a processor 31, a memory 32, an HDD 33, a communication I/F 34, a display device 35, and an input device 36, respectively.

Hardware Configuration of Image Processing Apparatus

Figure 4:
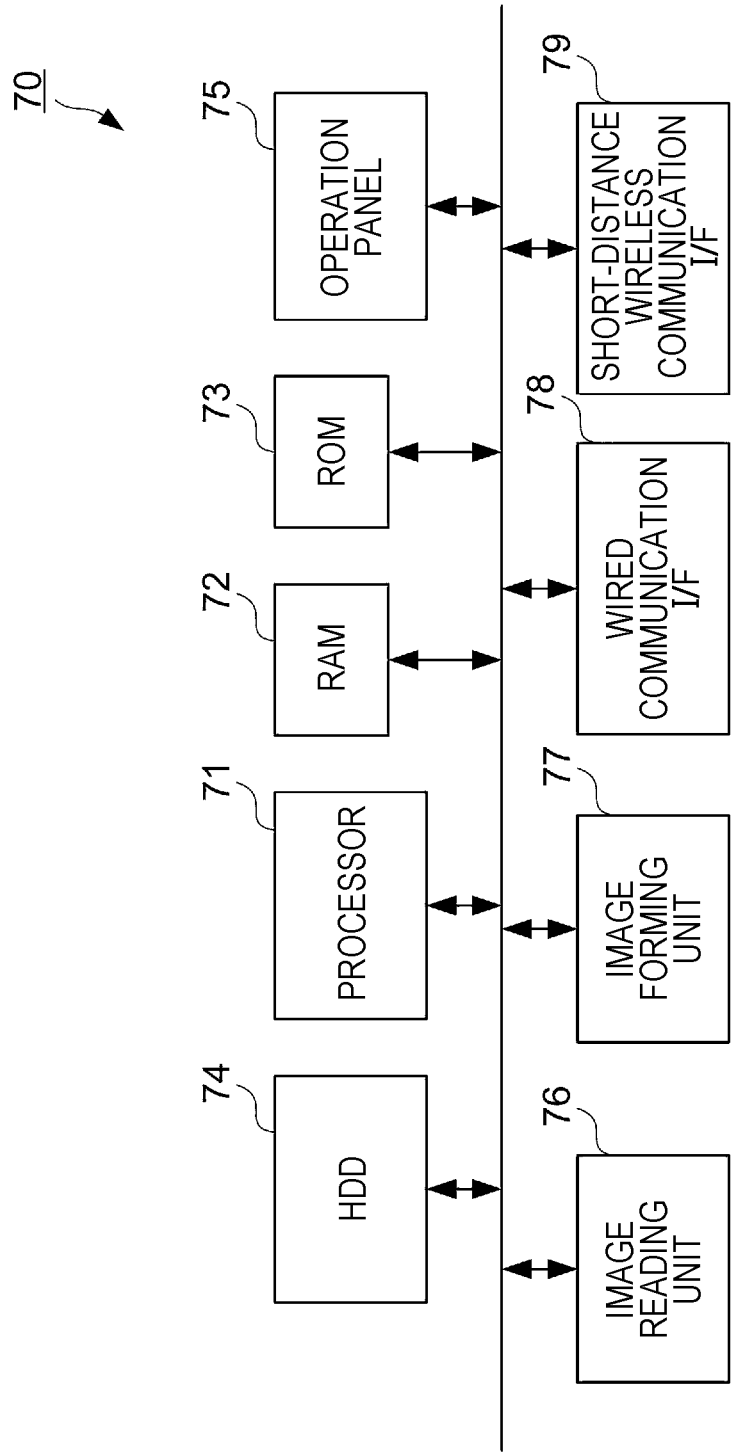
FIG. 4 is a diagram illustrating an example of the hardware configuration of an image processing apparatus according to the exemplary embodiment of the present disclosure.

FIG. 4 is a diagram illustrating an example of the hardware configuration of the image processing apparatus 70 according to the present exemplary embodiment. As illustrated in FIG. 4, the image processing apparatus 70 includes a processor 71, a RAM 72, a ROM 73, an HDD 74, an operation panel 75, an image reading unit 76, an image forming unit 77, a w red communication I/F 78, and a short-distance wireless communication I/F 79.

The processor 71 loads various programs stored in the ROM 73 or the like into the RAM 72 and executes the various programs in order to achieve functions that will be described later.

The RAM 72 is a memory used as a working memory of the processor 71. The ROM 73 is a memory storing the various programs executed by the processor 71. The HDD 74 is a magnetic disk device, for example, storing image data read by the image reading unit 76, image data used by the image forming unit 77 to form images, and the like.

The operation panel 75 is a touch panel, for example, that displays various pieces of information and that receives operations input by the user. The operation panel 75 includes a display on which the various pieces of information are displayed and a position detection sheet that detects a position specified using specification means such as a finger or a stylus pen. A display and a keyboard nay be used instead of the touch panel.

The image reading unit 76 reads images recorded on a recording medium such as sheets of paper. The image reading unit 76 is a scanner, for example, and may employ a charge-coupled device (CCD) method, in which CCDs receive light that has been emitted from a light source onto a document, reflected from the document, and then reduced by a lens, or a contact image sensor (CIS) method, in which light that has been sequentially emitted from light-emitting diodes (LEDs) onto a document and reflected from the document is received by CISs.

The image forming unit 77 forms images on a recording medium such as sheets of paper. The image forming unit 77 is a printer, for example, and may employ electrophotography, in which toner applied to a photoreceptor is transferred onto a recording medium to form images, or an inkjet method, in which ink is discharged onto a recording medium to form images.

The wired communication I/F 78 communicates various pieces of information with another apparatus, such as the printing server 50, over the communication network 90. The short-distance wireless communication I/F 79 communicates various pieces of information with the mobile terminal 10 through short-distance wireless communication such as NFC.

Outline of Present Exemplary Embodiment

In the printing system 1 having the above-described configuration according to the present exemplary embodiment, control is performed such that the printing server 50 obtains plural pieces of data posted in a group in the messaging service and certain pieces of data corresponding to a certain member of the group are printed.

Certain pieces of data corresponding to a certain member are data determined on the basis of the certain member.

An example of the data determined on the basis of a certain member is data relating to the certain member. This kind of data is determined on the basis that the data has a certain relationship with the certain member. Such data includes, for example, data posted in a group while the certain member belongs to the group. Such data also includes data used by the certain member or a member associated with the certain member, data used for the certain member or a member associated with the certain member, and data having an attribute relating to the certain member.

The data determined on the basis of a certain member, however, also includes data not relating to the certain member. This is because data not relating to the certain member is determined on the basis that the data does not relate to the certain member once the certain member is determined. Such data includes, for example, data posted by members of the group other than the certain member.

In the following description, data posted by a certain member while the certain member belongs to a group will be taken as an example of the data determined on the basis of a certain member.

Any type of control may be performed in order to print certain pieces of data. In the following description, however, control is performed such that printing instruction information for instructing a certain member to print of certain pieces of data is transmitted to the certain member and, after receiving the printing instruction information, the certain user selects the certain pieces of data on the basis of the printing instruction information.

Figure 5B:
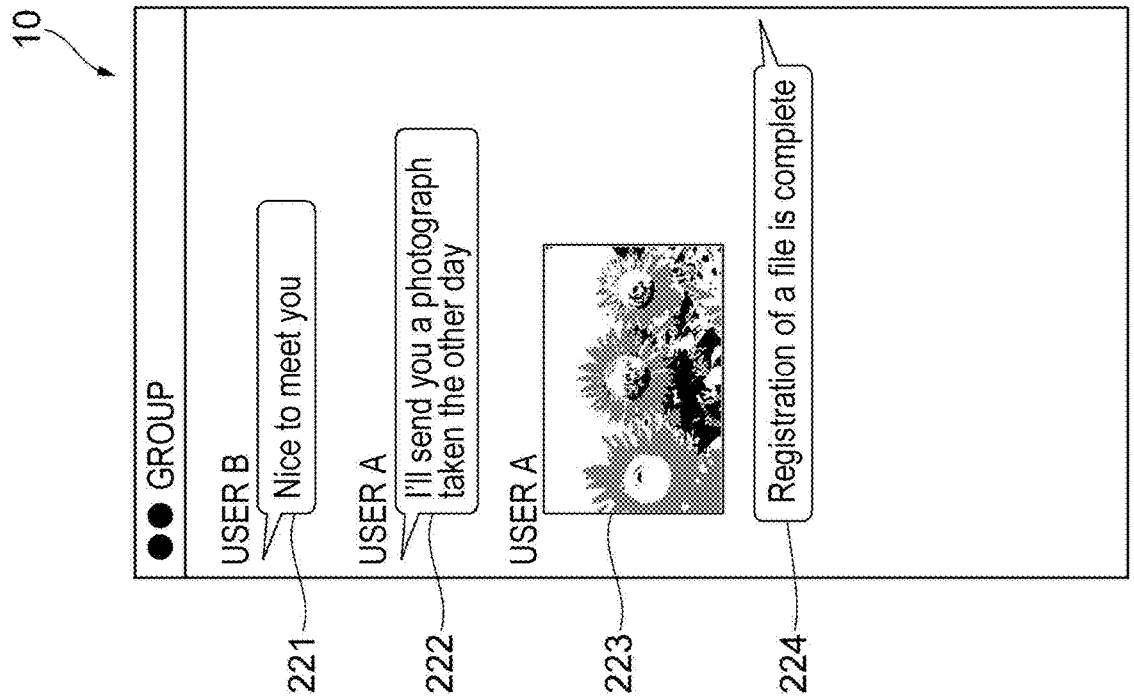
FIGS. 5A and 5B are diagrams illustrating an outline of the exemplary embodiment with an example of a group chat room of a messaging service displayed on the mobile terminal.
Figure 5A:
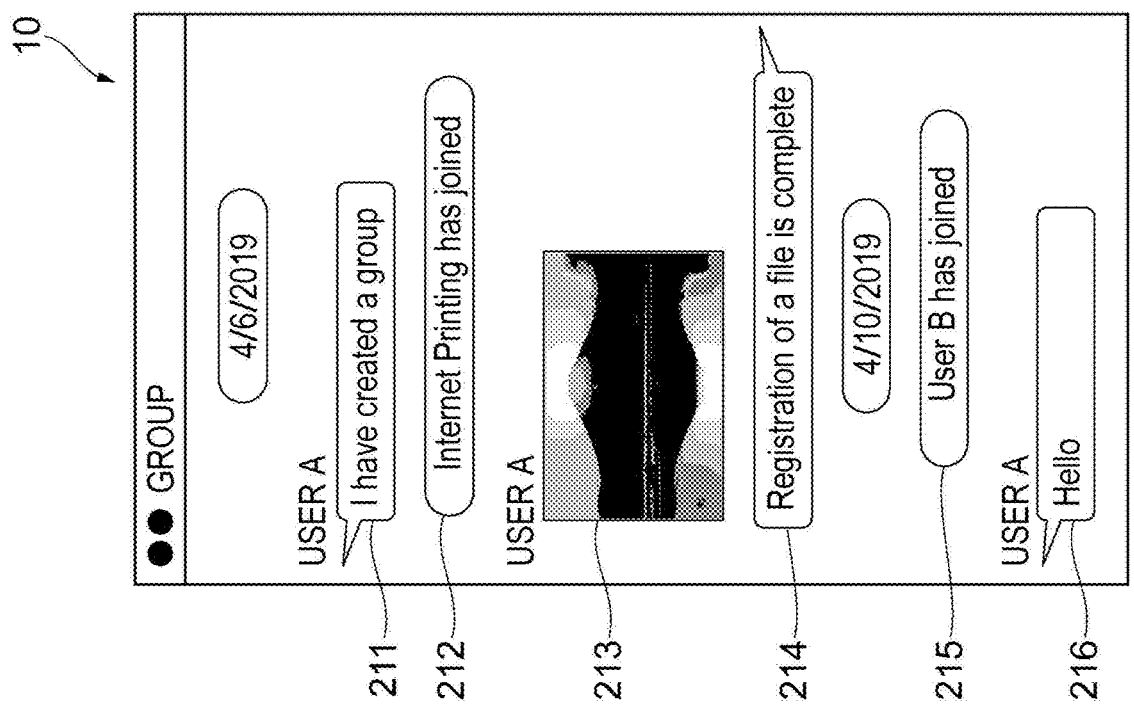

FIGS. 5A and 5B are diagrams illustrating an outline of the present exemplary embodiment with an example of a group chat room of the messaging service displayed on the mobile terminal 10.

In FIG. 5A, first, user A creates a group and posts a message 211.

It is assumed that user A then adds a bot of the printing server 50 to the group. The bot of the printing server 50 is a program for registering a file given by a user as a file to be printed. After the bot of the printing server 50 is added, therefore, users who have joined the group can register a file as a file to be printed by giving the file to the bot. The bot of the printing server 50 will be simply referred to as a "bot" hereinafter. The bot need not necessarily be added to a group in order for a file posted in a group to become printable, but the bot is added to a group in this example. The addition of the bot to a group is therefore an example of a case where data posted in a group becomes printable. The mobile terminal 10 indicates that the bot has been added to the group with a notification 212 indicating that "Internet Printing" has joined the group.

User A then posts a file 213, and the bot registers the file 213 as a file to be printed and posts a message 214.

It is assumed that user B then joins the group and a notification 215 indicates that user B has joined the group. User A posts a message 216 for user B.

Next, in FIG. 5B, user B posts a message 221 for user A.

User A then posts a message 222 and a file 223. The bot registers the file 223 as a file to be printed and posts a message 224.

If user B requests printing of a file posted in the group chat room in this state, a reservation number for printing the file is transmitted to user B. Even if user B displays the reservation number on the mobile terminal 10 and inputs the reservation number to the image processing apparatus 70, however, the file 213 posted before user B joins the group is not printed, and only the file 223 posted after user B joins the group w II be printed.

Functional Configuration of Printing System

Figure 6:
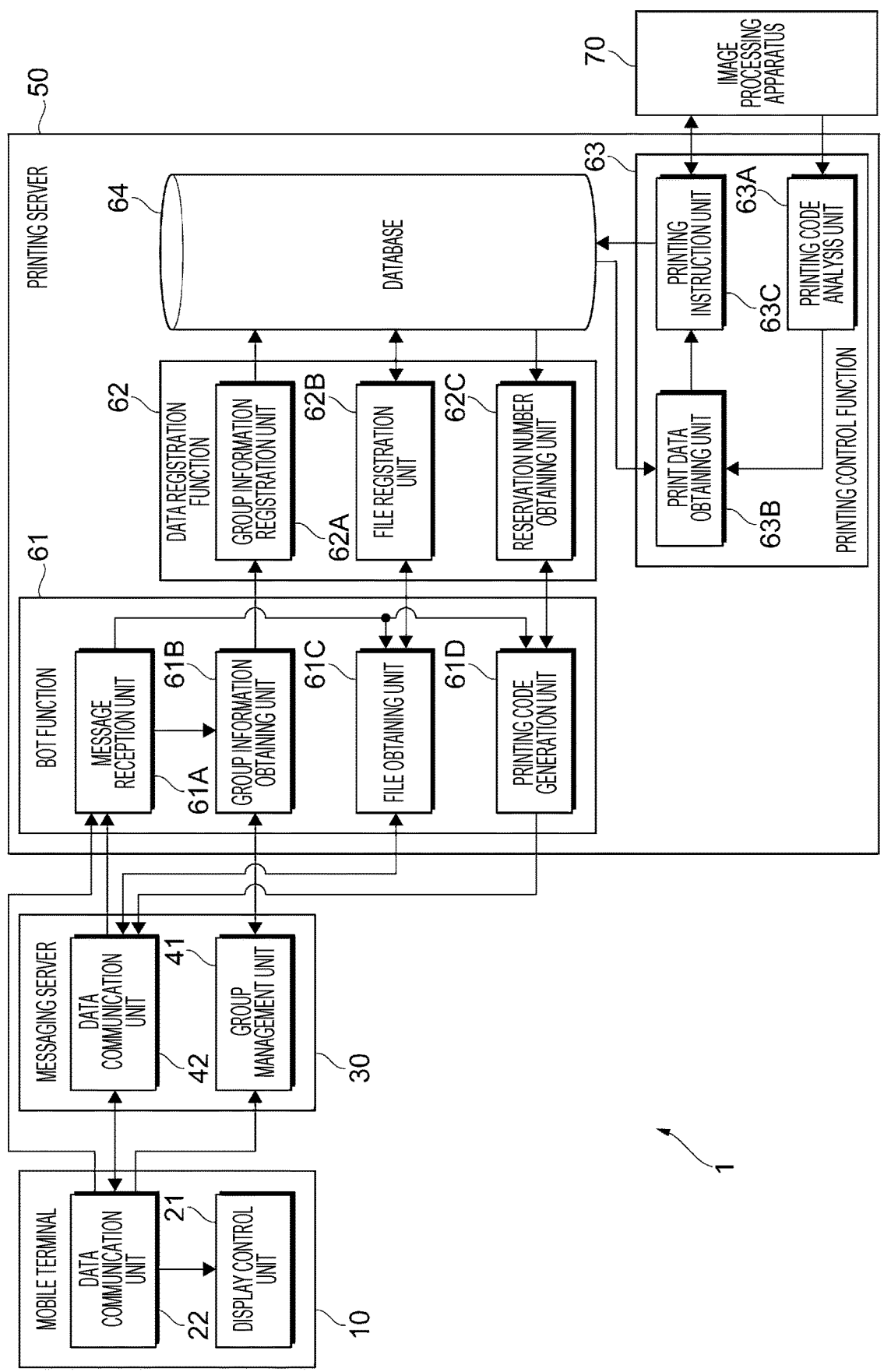
FIG. 6 is a block diagram illustrating an example of the functional configuration of the printing system according to the exemplary embodiment of the present disclosure.

FIG. 6 is a block diagram illustrating an example of the functional configuration of the printing system 1 according to the present exemplary embodiment.

First, the functional configuration of the mobile terminal 10 will be described. As illustrated in FIG. 6, the mobile terminal 10 includes a display control unit 21 and a data communication unit 22.

The display control unit 21 controls the touch panel 14 (refer to FIG. 2) in such a way as to display messages from the messaging server 30 and results of operations. In particular, the display control unit 21 controls the touch panel 14 in such a way as to display printing codes transmitted from the messaging server 30. The printing codes are displayed on the touch panel 14 and read by the image processing apparatus 70 in order to request printing. The printing codes may be, for example, quick response (QR) codes (registered trademark). The printing code is an example of printing instruction information for instructing a user to perform printing.

The data communication unit 22 transmits messages and files to the messaging server 30 and receives messages from the messaging server 30. The data communication unit 22 transmits messages to the printing server 50 and instructions to create a group to the messaging server 30 and receives printing codes from the messaging server 30.

These functional units are achieved by a combination of software and hardware resources. More specifically, these functional units are achieved by loading, using the processor 11, a program for achieving these functional units into the RAM 12 from the ROM 13 and executing the program Next, the functional configuration of the messaging server 30 will be described. As illustrated in FIG. 6, the messaging server 30 includes a group management unit 41 and a data communication unit 42.

The group management unit 41 creates groups in the messaging service and manages the groups and members belonging to the groups. For example, the group management unit 41 manages the groups using group identifiers (IDs) for uniquely identifying the groups in the printing system 1 and the members using user IDs for uniquely identifying users in the printing system 1.

The data communication unit 42 receives data posted by a user from a mobile terminal 10 used by the user and transmits the received data to mobile terminals 10 used by all users in a group. When the data communication unit 42 receives an instruction to join a user to a group from a mobile terminal 10, the data communication unit 42 transmits a message indicating that the user has joined the group to the messaging server 30. In addition, when the data communication unit 42 receives a file posted by the user from the mobile terminal 10, the data communication unit 42 transmits, to the messaging server 30, a message indicating that the file has been posted and presents the file in response to a request from the messaging server 30. Furthermore, when the data communication unit 42 receives a message requesting display of a printing code from the mobile terminal 10, the data communication unit 42 transmits a request to obtain a printing code to the messaging server 30 and obtains the printing code from the messaging server 30.

These functional units are achieved by a combination of software and hardware resources. More specifically, these functional units are achieved by loading, using the processor 31, a program for achieving these functional units into the memory 32 from the HDD 33 and executing the program Next, the functional configuration of the printing server 50 will be described. As illustrated in FIG. 6, the printing server 50 includes a message reception unit 61A, a group information obtaining unit 61B, a file obtaining unit 61C, and a printing code generation unit 61D for a bot function 61. The printing server 50 also includes a group information registration unit 62A, a file registration unit 62B, and a reservation number obtaining unit 62C for a data registration function 62. The printing server 50 also includes a printing code analysis unit 63A, a print data obtaining unit 63B, and a printing instruction unit 63C for a printing control function 63. The printing server 50 also includes a database 64.

The message reception unit 61A receives a message from the messaging server 30 and analyzes the message. For example, the message reception unit 61A determines whether the message indicates that the bot has been added to a group, that a user has joined a group, that a user has posted a file, or that display of a printing code is being requested.

When the message reception unit 61A receives a message indicating that the bot has been added to a group, the group information obtaining unit 61B obtains group information from the messaging server 30 and transmits the group information to the data registration function 62. When the message reception unit 61A receives a message indicating that a user has joined the group, the group information obtaining unit 61B transmits the group information received by the message reception unit 61A to the data registration function 62.

When the message reception unit 61A receives a message indicating that a user has posted a file, the file obtaining unit 61C obtains the file from the messaging server 30 and transmits the file to the data registration function 62. In the present exemplary embodiment, the file obtaining unit 61C is provided as an example of means for obtaining plural pieces of data posted in a group in the messaging service.

When the message reception unit 61A receives a message indicating that display of a printing code is being requested, the printing code generation unit 61D generates a printing code. At this time, the printing code generation unit 61D obtains a reservation number corresponding to a group ID included in the message from the data registration function 62 and embeds the reservation number and a user ID included in the message in the printing code. The printing code generation unit 61D then transmits the generated printing code to the messaging server 30. In this case, the reservation number is an example of group identification information for identifying a group, and the user ID is an example of member identification information for identifying a certain member. In the present exemplary embodiment, the printing code generation unit 61D is provided as an example of means for performing control such that printing instruction information for instructing a certain member to print a certain piece of data is transmitted to the certain member.

The group information registration unit 62A registers the group information received from the bot function 61 to the database 64.

The file registration unit 62B receives a file from the bot function 61, converts a format of the file into a printable one, and registers the file to the database 64. More specifically, the file registration unit 62B registers the file while associating the file with a reservation number. Upon completing the registration of the file to the database 64, the file registration unit 62B transmits a registration result to the bot function 61. The registration result may be information indicating that the registration has been successfully completed or failed.

The printing code analysis unit 63A receives a printing code from the image processing apparatus 70 and extracts a reservation number and a user ID from the printing code.

The print data obtaining unit 63B searches the database 64 on the basis of the reservation number extracted by the printing code analysis unit 63A, obtains print data associated with the reservation number, and gives the print data to the printing instruction unit 63C. In the present exemplary embodiment, the print data obtaining unit 63B is provided as an example of means for, when printing instruction information is received, selecting a certain one of plural pieces of data on the basis of the printing instruction information.

The printing instruction unit 63C communicates with the image processing apparatus 70. More specifically, the printing instruction unit 63C obtains print data from the print data obtaining unit 63B and transmits the print data to the image processing apparatus 70. The printing instruction unit 63C receives a result of printing from the image processing apparatus 70 and writes a printing record to the database 64 on the basis of the result of printing.

The database 64 includes a group table storing information regarding groups, a group member table storing information regarding members of the groups, and a user table storing information regarding users. The database 64 also includes a file management table for managing files and a printing record management table for managing printing records. Specific examples of these tables will be described later.

These functional units are achieved by a combination of software and hardware resources. More specifically, these functional units are achieved by loading, using the processor 51, a program for achieving these functional units into the memory 52 from the HDD 53 and executing the program FIG. 7 is a diagram illustrating a specific example of the group table stored in the database 64. As illustrated in FIG. 7, group IDs, reservation numbers, and bot joining tines are associated with each other on the group table. The group IDs are identification information regarding groups of the messaging service. The reservation numbers are numbers used to identify files posted in groups identified by corresponding group IDs. The bot joining tines are times at which the bot has joined the groups identified by the corresponding group IDs. In FIG. 7, it is indicated, for example, that a reservation number of a group whose group ID is "Group-dshrap1" is "AS98XMIP" and the bot has joined the group at 11:22 on Apr. 6, 2019.

FIG. 8 is a diagram illustrating a specific example of the group member table stored in the database 64. As illustrated in FIG. 8, group IDs, user IDs, group joining tines, and group leaving times are associated with one another on the group member table. The user IDs are identification information regarding users. The group IDs are identification information regarding groups to which users identified by corresponding user IDs belong. The group joining times are times at which users identified by the corresponding user IDs have joined groups identified by corresponding group IDs. The group leaving times are times at which the users identified by the corresponding user IDs have left the groups identified by the corresponding group IDs. When the group leaving time is blank, it means that a corresponding user has not left a corresponding group. In FIG. 8, for example, it is indicated that members of the group whose group ID is "Group-dshrap1" are users whose user IDs are "U001a", "U002b", and "U003c" and that the users have joined the group at 11:22 on April 6, 16:32 on April 10, and 22:06 on Apr. 15, 2019, respectively, and none of the users has left the group.

FIG. 9 is a diagram illustrating a specific example of the user table stored in the database 64. As illustrated in FIG. 9, user IDs and terms of use agreement times are associated with each other on the user table. The user IDs are identification information regarding users. The terms of use agreement times are times at which users identified by corresponding user IDs have agreed to terms of use for the printing service. When the terms of use agreement time is blank, it means that a corresponding user has not agreed to the terms of use for the printing service. In FIG. 9, for example, it is indicated that the user whose user ID is "U001a" has agreed to the terms of use for the printing service at 11:24 on Apr. 6, 2019.

FIG. 10 is a diagram illustrating a specific example of the file management table stored in the database 64. As illustrated in FIG. 10, file IDs, file names, reservation numbers, posting times, user IDs, and registration results are associated with one another on the file management table. The file IDs are identification information regarding files. The file names are names of files identified by corresponding file IDs. The reservation numbers are numbers used to identify the files identified by the corresponding file IDs. The posting times are times at which the files identified by the corresponding file IDs have been posted. The user IDs are identification information regarding users who have posted the files identified by the corresponding file IDs. The registration results are statuses achieved as registration results of the files identified by the corresponding file IDs. In FIG. 10, for example, it is indicated that a file whose file ID is "Doc-111123", which has been posted by the user whose user ID is "U001a" at 14:02 on Apr. 5, 2019, and a file whose file ID is "Doc-124583", which has been posted by the user whose user ID is "U001a" at 13:21 on Apr. 12, 2019, are identified using the reservation number "AS98XMIP".

FIG. 11 is a diagram illustrating a specific example of the printing record management table stored in the database 64. As illustrated in FIG. 11, reservation numbers, file IDs, sheet sizes, color types, double-sided, the number of copies, and fees are associated with one another on the printing record management table. The file IDs are identification information regarding files. The reservation numbers are numbers used to identify files identified by corresponding file IDs. The sheet sizes are sizes of sheets used to print the files identified by the corresponding file IDs. The color types are types indicating whether the files identified by the corresponding file IDs have been printed in color or black-and-white. The double-sided is information indicating whether double-sided printing has been specified when the files identified by the corresponding file IDs have been printed. The number of copies are the number of sheets on which the files identified by the corresponding file IDs have been printed. The fees are money paid when the files identified by the corresponding file IDs have been printed.

Operation of Printing System

The operation of the printing system 1 according to the outline illustrated in FIGS. 5A and 5B will be described hereinafter. That is, an operation will be described in which when users A and B are using the printing system 1, a file posted by user A before user B joins a group is not printed and only a file posted by user A after user B joins the group is printed in response to a request for printing made by user B.

Figures 1, 12:
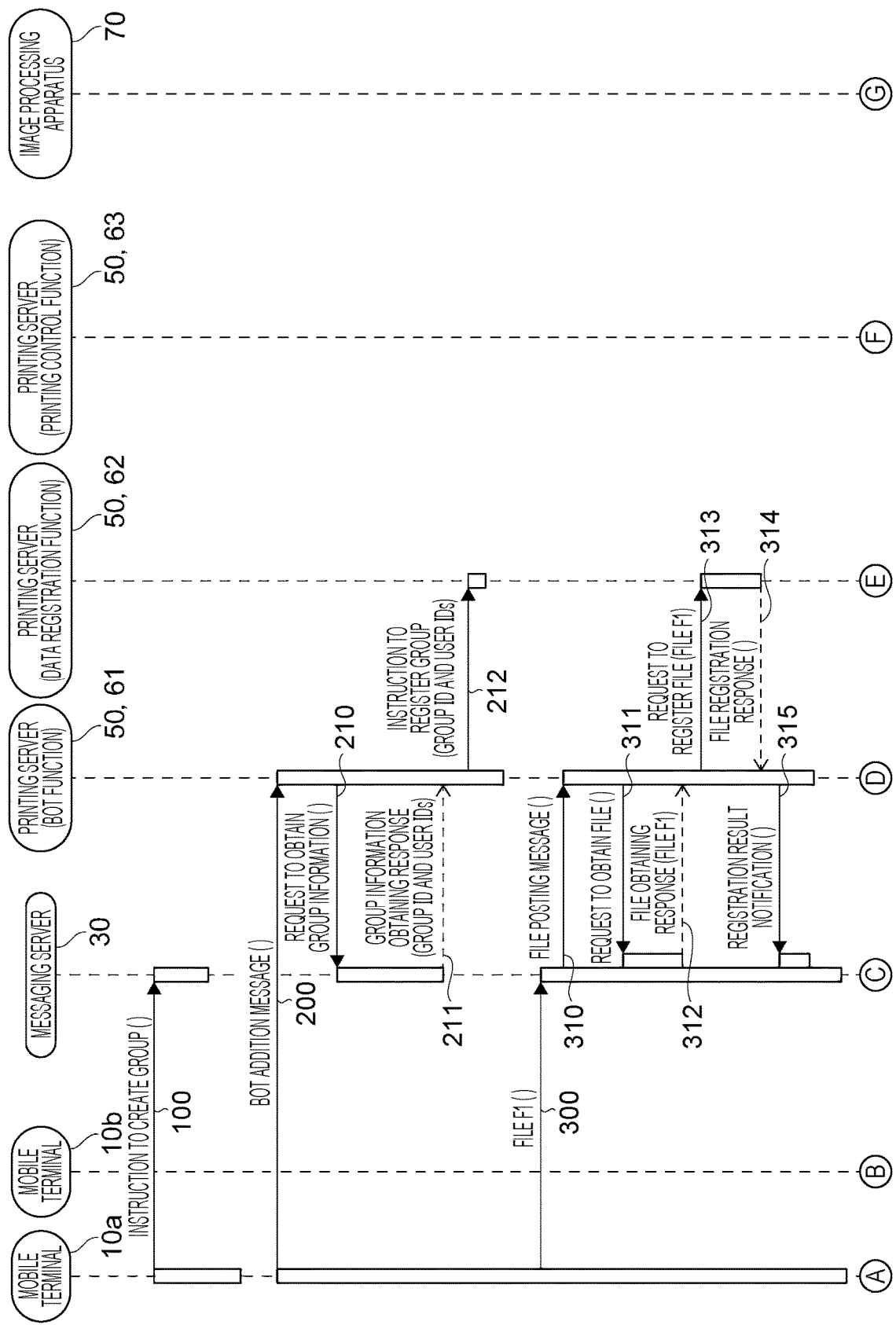
Figures 3, 12:
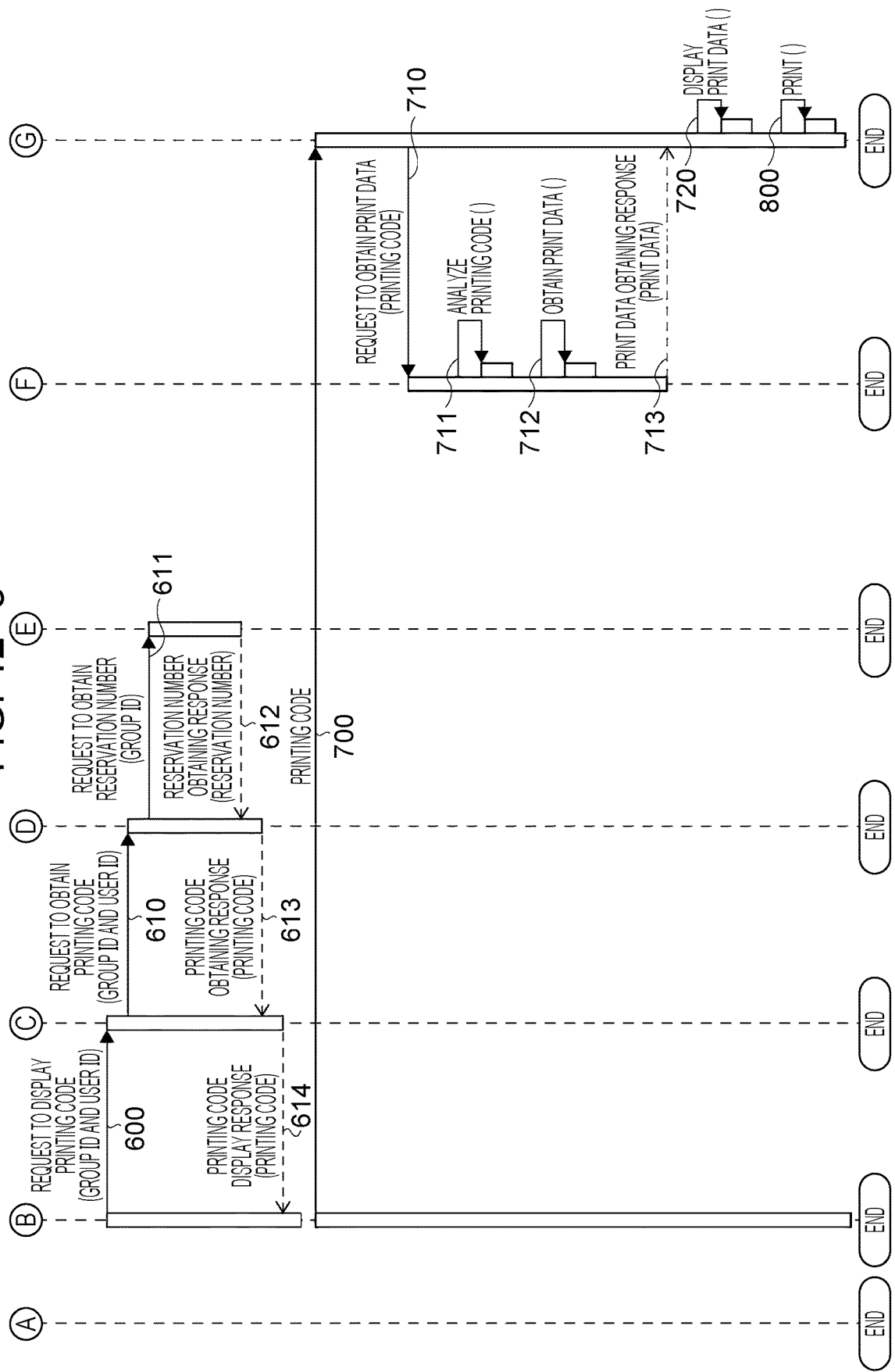

FIGS. 12-1 to 12-3 are sequence diagrams illustrating an example of the operation of the printing system 1.

First, it is assumed, as illustrated in FIG. 12-1, that user A creates a group in the messaging service using the mobile terminal 10a. The data communication unit 22 of the mobile terminal 10a transmits an instruction to create a group to the messaging server 30 (step 100). As a result, the messaging server 30 creates a group chat room More specifically, the group management unit 41 creates group information regarding the group and members of the group and manages the group information.

Next, it is assumed that user A adds the bot to the group using the mobile terminal 10a. The data communication unit 22 of the mobile terminal 10a transmits a bot addition message indicating that the bot has been added to the group to the bot function 61 of the printing server 50 (step 200). The bot addition message includes a time at which the bot has been added to the group, that is, a bot joining time. The message reception unit 61A receives the bot addition message and gives the bot joining time to the group information obtaining unit 61B.

As a result, the group information obtaining unit 61B obtains the group information regarding the group to which the bot has been added. More specifically, the group information obtaining unit 61B transmits a request to obtain group information to the messaging server 30 (step 210). The group management unit 41 of the messaging server 30 then transmits a group information obtaining response to the bot function 61 of the printing server 50 (step 211). The group information obtaining response includes a group ID of the group in the messaging service and user IDs of users who are the members of the group. If the users are asked whether to agree to the terms of use for the printing service when the bot is added to the group, the group information obtaining response also includes terms of use agreement times.

The group information obtaining unit 61B of the bot function 61 of the printing server 50 then transits an instruction to register a group including the group ID and the user IDs to the data registration function 62 of the printing server 50 (step 212). The instruction to register a group also includes the bot joining time and the terms of use agreement times. As a result, the group information registration unit 62A of the data registration function 62 of the printing server 50 registers the group information to the database 64. More specifically, the group information registration unit 62A issues a reservation number for the group and registers the reservation number to the group table while associating the reservation number with the group ID obtained in step 212. The group information registration unit 62A also registers the bot joining time to the group table while associating the bot joining time with the group ID. Furthermore, the group information registration unit 62A registers the user IDs obtained in step 212 to the group member table while associating the user IDs with the group ID. In addition, the group information registration unit 62A registers the bot joining time to the group member table as a group joining time of a user who has already joined the group while associating the bot joining time with the group ID. Furthermore, if the users are asked whether to agree to the terms of use for the printing service when the bot is added to the group, the group information registration unit 62A registers the terms of use agreement times to the user table while associating the terms of use agreement times with the user IDs.

It is assumed next that user A posts a file F1 in the group chat room The data communication unit 22 of the mobile terminal 10*a* then transmits the file F1 to the messaging server 30 (step 300).

As a result, the data communication unit 42 of the messaging server 30 transmits, to the bot function 61 of the printing server 50, a file posting message indicating that the file has been posted (step 310). The file posting message includes the group ID of the group in which the file F1 has been posted, the user ID of the user who has posted the file F1, and a time at which the file F1 has been posted.

The message reception unit 61A of the bot function 61 of the printing server 50 receives and analyzes the file posting message transmitted in step 310 and determines that the file has been posted. At this time, the message reception unit 61A gives the group ID, the user ID, and the posting time to the file obtaining unit 61C. The file obtaining unit 61C obtains the file F1. More specifically, the file obtaining unit 61C transmits a request to obtain a file to the messaging server 30 (step 311). The data communication unit 42 of the messaging server 30 then transmits a file obtaining response including the file F1 to the bot function 61 of the printing server 50 (step 312).

The file obtaining unit 61C of the bot function 61 of the printing server 50 transits a request to register a file including the file F1 to the data registration function 62 of the printing server 50 (step 313). The request to register a file also includes the group ID, the posting time, and the user ID. As a result, the file registration unit 62B of the data registration function 62 of the printing server 50 converts a format of the file F1 into a printable one and registers the file F1 to the file management table while associating the file F1 with the reservation number. More specifically, the file registration unit 62B obtains the reservation number by searching the group table using the group ID as a key and registers the reservation number to the file management table while associating the reservation number with a file ID, which is identification information regarding the file F1. At this time, the file registration unit 62B also registers the posting time and the user ID received in step 313 to the file management table while associating the posting time and the user ID with the file ID. The file registration unit 62B then transmits a file registration response including a registration result of the file F1 to the bot function 61 of the printing server 50 (step 314).

The file obtaining unit 61C of the bot function 61 of the printing server 50 transmits, to the messaging server 30, a registration result notification for notifying the messaging server 30 of the registration result received in step 314 (step 315). The registration result includes information indicating whether the registration of the file has been successfully completed or failed and, if the registration of the file has failed, error information. Alternatively, the file obtaining unit 61C may transmit a thumbnail image of the registered file to the messaging server 30 instead of the registration result notification. The registration result notification or the thumbnail image is received by the data communication unit 42 of the messaging server 30.

Next, it is assumed, as illustrated in FIG. 12-2, that user B joins the sane group in the messaging service using the mobile terminal 10*b*. The data communication unit 22 of the mobile terminal 10*b* transmits an instruction to join the group to the messaging server 30 (step 400).

As a result, the data communication unit 42 of the messaging server 30 transmits a group joining message indicating that user B has joined the group to the bot function 61 of the printing server 50 (step 410). The group joining message includes the group ID of the group and a user ID of user B, who is the joining member. Furthermore, if the users are asked whether to agree to the terms of use for the printing service when the users join a group, the group joining message also includes a terms of use agreement time.

The message reception unit 61A of the bot function 61 of the printing server 50 receives and analyzes the group joining message transmitted in step 410 and determines that user B has joined the group. At this time, the message reception unit 61A gives the group ID, the user ID, the group joining time, and the terms of use agreement time to the group information obtaining unit 61B. The group information obtaining unit 61B then transmits an instruction to register a group member including the group ID and the user ID to the data registration function 62 of the printing server 50 (step 411). As a result, the group information registration unit 62A of the data registration function 62 of the printing server 50 registers user B to the database 64 as a group member. More specifically, the group information registration unit 62A registers the user ID and the group joining time obtained in step 411 to the group member table while associating the user ID and the group joining time with the group ID. If the users are asked whether to agree to the terms of use for the printing service when the users j oi n a group, the group information registration unit 62A registers the terms of use agreement time to the user table while associating the terms of use agreement time with the user ID.

Next, it is assumed that user A posts a file F2 in the group chat room using the mobile terminal 10*a*. The data communication unit 22 of the mobile terminal 10*a* transmits the file F2 to the messaging server 30 (step 500).

As a result, the data communication unit 42 of the messaging server 30 transmits, to the bot function 61 of the printing server 50, a file posting message indicating that the file has been posted (step 510). The file posting message includes the group ID of the group in which the file F2 has been posted, the user ID of the user who has posted the file F2, and a time at which the file F2 has been posted.

The message reception unit 61A of the bot function 61 of the printing server 50 receives and analyzes the file posting message transmitted in step 510 and determines that the file has been posted. At this time, the message reception unit 61A gives the group ID, the user ID, and the posting time to the file obtaining unit 61C. The file obtaining unit 61C obtains the file F2. More specifically, the file obtaining unit 61C transmits a request to obtain a file to the messaging server 30 (step 511). The data communication unit 42 of the messaging server 30 transmits a file obtaining response including the file F2 to the bot function 61 of the printing server 50 (step 512).

The file obtaining unit 61C of the bot function 61 of the printing server 50 then transmits a request to register a file including the file F2 to the data registration function 62 of the printing server 50 (step 513). The request to register a file includes the group ID, the posting time, and the user ID. As a result, the file registration unit 62B of the data registration function 62 of the printing server 50 converts a format of the file F2 into a printable one and registers the file F2 to the file management table while associating the file F2 with the reservation number. More specifically, the file registration unit 62B obtains the reservation number by searching the group table using the group ID as a key and registers the reservation number to the file management table while associating the reservation number with a file ID, which is identification information regarding the file F2. At this time, the file registration unit 62B registers the posting time and the user ID received in step 513 to the file management table while associating the posting time and the user ID with the file ID. The file registration unit 62B then transmits a file registration response including a registration result of the file F2 to the bot function 61 of the printing server 50 (step 514).

The file obtaining unit 61C of the bot function 61 of the printing server 50 transits a registration result notification for notifying the messaging server 30 of the registration result received in step 514 to the messaging server 30 (step 515). The registration result includes information indicating whether the registration of the file has been successfully completed or failed and, if the registration of the file has failed, error information. Alternatively, the file obtaining unit 61C may transmit a thumbnail image of the registered file to the messaging server 30 instead of the registration result notification. The registration result or the thumbnail image is received by the data communication unit 42 of the messaging server 30.

Next, it is assumed, as illustrated in FIG. 12-3, that user B performs an operation for displaying a printing code using the mobile terminal 10b. The data communication unit 22 of the mobile terminal 10b transmits a request to display a printing code including the group ID and the user ID to the messaging server 30 (step 600). The group ID may be obtained from the chat room of the messaging service displayed by user B on the mobile terminal 10b, and the user ID may be obtained, for example, from login information regarding user B for the messaging service.

As a result, the data communication unit 42 of the messaging server 30 transmits a request to obtain a printing code to the bot function 61 of the printing server 50 as a message (step 610). The request to obtain a printing code includes the group ID and the user ID that are also included in the request to display a printing code.

The message reception unit 61A of the bot function 61 of the printing server 50 receives and analyzes the message transmitted in step 610 and determines that the request to obtain a printing code has been transmitted. At this time, the message reception unit 61A gives the group ID and the user ID to the printing code generation unit 61D. The printing code generation unit 61D then gives the group ID to the data registration function 62 of the printing server 50 and obtains reservation numbers from the data registration function 62. More specifically, the printing code generation unit 61D transmits a request to obtain a reservation number including the group ID to the data registration function 62 of the printing server 50 (step 611). As a result, the reservation number obtaining unit 62C of the data registration function 62 of the printing server 50 obtains, from the group table stored in the database 64, the reservation number associated with the group ID received in step 611. The reservation number obtaining unit 62C then transmits a reservation number obtaining response including the obtained reservation numbers to the bot function 61 of the printing server 50 (step 612).

The printing code generation unit 61D of the bot function 61 of the printing server 50 then generates a printing code including the reservation number and the user ID and transmits a printing code obtaining response including the printing code to the messaging server 30 (step 613). The data communication unit 42 of the messaging server 30 receives the printing code display response including the printing code and transmits the printing code display response to the mobile terminal 10b (step 614). As a result, the data communication unit 22 of the mobile terminal 10b receives the printing code, and the display control unit 21 displays the printing code on the touch panel 14 (refer to FIG. 2).

It is assumed, on the other hand, that user B holds the printing code displayed on the touch panel 14 (refer to FIG. 2) of the mobile terminal 10b onto the image processing apparatus 70. The data communication unit 22 of the mobile terminal 10b transmits the printing code to the image processing apparatus 70 via the short-distance wireless communication I/F 17 (refer to FIG. 2) (step 700).

As a result, the image processing apparatus 70 inquires print data of the printing server 50. More specifically, the image processing apparatus 70 transmits a request to obtain print data including the printing code to the printing control function 63 of the printing server 50 (step 710).

The printing code analysis unit 63A of the printing control function 63 of the printing server 50 receives the request to obtain print data and analyzes the printing code included in the request to obtain print data (step 711). As a result, the reservation numbers and the user ID are obtained from the printing code.

The print data obtaining unit 63B of the printing control function 63 of the printing server 50 obtains print data including the files associated with the reservation number by searching the file management table stored in the database 64 on the basis of the reservation number (step 712). More specifically, the print data obtaining unit 63B obtains the group joining time of user B by searching the group member table stored in the database 64 using the user ID as a key. The print data obtaining unit 63B then compares, for each file, the posting time and the group joining time of user B and excludes files whose posting times are before the group joining time. Alternatively, the print data obtaining unit 63B may obtain the terms of use agreement time of the user who has posted each file by searching the user table stored in the database 64 using a user ID as a key. The print data obtaining unit 63B may then compare, for each file, the posting time and the terms of use agreement time of the user who has posted the file and exclude, from the print data, files whose posting times are before the terms of use agreement time. The printing instruction unit 63C of the printing control function 63 of the printing server 50 then transmits a print data obtaining response including the print data to the image processing apparatus 70 (step 713).

As a result, the image processing apparatus 70 displays the print data (step 720).

It is assumed that user B then selects, in the print data displayed on the image processing apparatus 70, a file to be printed. The image processing apparatus 70 prints the selected file (step 800). When the printing of the selected file is completed, the printing instruction unit 63C registers a printing record including a sheet size, a color type, double-sided, the number of copies, and a fee set at the time of the printing to the printing record management table stored in the database 64.

The following modifications may be implemented in the sequence illustrated in FIGS. 12-1 to 12-3.

First, when a user is permitted to obtain files posted in a group before joining the group, the user may be enabled to print such files. In this case, in step 212 illustrated in FIG. 12-1, the group information registration unit 62A nay register, for a user who has al ready joined a group when the bot is added, a time at which the user has actually joined the group to the group member table as a group joining time. For example, the group information registration unit 62A may estimate a time at which the user has joined the group on the basis of past posts in the group and register the time. This is an example of a case where a period for which a certain member belongs to a group includes a period before data posted in the group becomes printable for the certain member.

Secondly, although the bot function 61 of the printing server 50 generates a printing code in steps 600 to 614 illustrated in FIG. 12-3, the mobile terminal 10 may generate a printing code, instead. In this case, the mobile terminal 10b transmits only a group ID to the bot function 61 of the printing server 50 via the messaging server 30 in steps 600 and 610. In steps 613 and 614, the bot function 61 of the printing server 50 transmits a reservation number, not a printing code, to the mobile terminal 10 via the messaging server 30. Since the mobile terminal 10b recognizes a user ID, the mobile terminal 10b may generate a printing code including the reservation number and the user ID.

Alternatively, the messaging server 30 may generate a printing code. In this case, in step 610, the messaging server 30 transmits only a group ID to the bot function 61 of the printing server 50. In step 613, the bot function 61 of the printing server 50 transmits a reservation number, not a printing code, to the messaging server 30. Since the messaging server 30 has received the user ID from the mobile terminal 10b, the messaging server 30 may generate a printing code including the reservation number and the user ID.

In the above description, a printing code includes a reservation number and a user ID, and files to be included in print data are identified on the basis of the reservation number and the user ID at the time of printing. This is an example of a case where printing instruction information includes group identification information and member identification information and selection of a certain piece of data includes selection of the certain piece of data based on the group identification information and the member identification information.

When printing is performed with a printing code including a reservation number and a group joining time of a user obtained from a user ID, however, files to be included in print data may be identified on the basis of the reservation number and the group joining time. This is an example of a case where printing instruction information includes group identification information and belonging period information, which indicates a period for which a certain member belongs to a group, and selection of a certain piece of data includes selection of the certain piece of data based on the group identification information and the belonging period information. More specifically, in step 611, the printing code generation unit 61D may transmit not only a group ID but also a user ID to the reservation number obtaining unit 62C, and in step 612, the reservation number obtaining unit 62C may obtain not only a reservation number but also a group joining time and transmit the reservation number and the group joining time to the printing code generation unit 61D and the printing code generation unit 61D may generate a printing code including the reservation number and the group joining time. In step 711 illustrated in FIG. 12-3, the printing code analysis unit 63A may extract the reservation number and the group joining time from the printing code, and in step 712, the print data obtaining unit 63B may obtain print data including files identified on the basis of the reservation number and the group joining time.

Alternatively, when printing is performed with a printing code including a reservation number and file IDs of files posted in a period for which a user belongs to a group, the file IDs being obtained from a user ID, files to be included in print data may be identified on the basis of the reservation number and the file IDs. This is an example of a case where printing instruction information includes data identification information and selection of a certain piece of data includes selection of the certain period of data based on the data identification information. More specifically, in step 611, the printing code generation unit 61D may transmit not only a group ID but also a user ID to the reservation number obtaining unit 62C, and in step 612, the reservation number obtaining unit 62C may obtain file IDs associated with posting times after a group joining time associated with the user ID and transmit the file IDs to the printing code generation unit 61D and the printing code generation unit 61D may generate a printing code including the file IDs. In step 711 illustrated in FIG. 12-3, the printing code analysis unit 63A may extract the file IDs from the printing code, and in step 712, the print data obtaining unit 63B may obtain print data including files identified on the basis of the file IDs.

Furthermore, although a reservation number and a user ID are together input to the image processing apparatus 70 by holding a printing code including the reservation number and the user ID onto the image processing apparatus 70 in step 700 illustrated in FIG. 12-3, another method may be employed, instead. A reservation number and a user ID may be separately input to the image processing apparatus 70, instead.

Thirdly, since the print data obtaining unit 63B obtains files posted after user B joins the group in step 712 illustrated in FIG. 12-3, files posted by user B, if any, after user B joins the group are also included in print data. When files posted by a user need not be printed in response to a request for printing made by the user, however, the print data obtaining unit 63B may obtain print data while excluding the files posted by the user. That is, the print data obtaining unit 63B may obtain print data including files other than ones corresponding to a user ID extracted by the printing code analysis unit 63A from a printing code, instead.

Fourthly, although not illustrated in FIGS. 12-1 to 12-3, group leaving times may also be managed when users have left a group. For example, in steps 400 to 411 illustrated in FIG. 12-2, the mobile terminal 10b notifies, via the messaging server 30 and the bot function 61 of the printing server 50, the data registration function 62 of the printing server 50 that user B has left the group. As a result, the data registration function 62 may write a group leaving time to the group member table while associating the group leaving time with the user ID of user B. In this case, the print data obtaining unit 63B may also obtain group leaving tines from the group member table stored in the database 64 in step 712 illustrated in FIG. 12-3 and include, in print data, only files posted before users who have left a group leave the group. This is an example of a case where performing control in such a way as to print a certain piece of data includes performing control in such a way as to print a certain piece of data posted in a group in a period for which the certain member belonged to the group in response to a request made by the certain user after the certain member leaves the group.

Applications

Although a case where files posted in a period for which a user who has made a request for printing has belonged to a group are printed has been described in the above exemplary embodiment, a rode in which files to be printed are limited is not limited to this.

For example, only files saved by a user who has made a request for printing may be printed. Alternatively, only files "liked" or commented on by a user who has made a request for printing may be printed. In this case, the files saved by the user who has made the request for printing and the files "liked" or commented on by the user who has made the request for printing are examples of data used by a certain member.

In addition, only files posted by members of a group who are registered as friends by a user who has made a request for printing may be printed. In this case, the files posted by the members registered as friends by the user who has made the request for printing are an example of data used by a member associated with a certain member.

Furthermore, only files posted for a user who has made a request for printing may be printed. In this case, the files posted for the user who has made the request for printing are an example of data used for a certain member.

Furthermore, only files including images of a user who has made a request for printing may be printed. This may be achieved, for example, by obtaining only files in which the user who has made the request for printing is tagged. Alternatively, when events and files are posted while being associated with each other, only files associated with events in which a user who has made a request for printing has participated may be printed. In this case, the files including the images of the user who has made the request for printing and the files associated with the events in which the user who has made the request for printing has participated are examples of data having an attribute relating to a certain member.

As described above, on the other hand, only files other than ones posted by a user who has made a request for printing may be printed. In this case, the files other than the files posted by the user who has made the request for printing are an example of data posted by a member of a group other than a certain member.

In addition, although not described in the above exemplary embodiment, the image processing apparatus 70 may have a function of rearranging files on the basis of one of these conditions. When the image processing apparatus 70 has such a function, files likely to be selected as files to be printed, that is, for example, files "liked" by a user who has made a request for printing, are displayed first.

As a result, when the image processing apparatus 70 is installed in a store or the like, files to be printed are promptly selected, thereby reducing time other users waits for printing to be available.

Processor

In the embodiments above, the term"processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Program

The processes performed by the printing server 50 according to the above exemplary embodiment are prepared, for example, as a program such as application software.

That is, a program for achieving the above exemplary embodiment is regarded as a program for causing a computer to perform a process including obtaining plural pieces of data posted in a group in a messaging service and performing control in such a way as to print a certain one of the plural pieces of data according to a certain member of the group.

The program for achieving the above exemplary embodiment may be provided by communication means or stored in a storage medium such as a compact disc read-only memory (CD-ROM and provided.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A printing control apparatus comprising:
a processor configured to:
in response to receiving a request to print from a certain member of a group in a messaging service:
obtain a plurality of files posted in the group including a file that was posted in the group before the certain member has joined the group and a file that was posted after the certain member has joined the group, wherein
the plurality of files are registered with a same print reservation number associated with the group, and
the request to print from the certain member identifies said print reservation number;
compare a posting time of each of the obtained plurality of files to a joining time of the certain member at which the certain member joined the group;
exclude files whose posting times are before the joining time of the certain member;

display, on a terminal of the certain member, a list of the plurality of files after excluding the files whose posting times are before the joining time of the certain member; and in response to selection, by the certain member, of a certain file from the displayed list, print the certain file.

2. The printing control apparatus according to claim 1, wherein the displayed list is a plurality of files relating to the certain member.

3. The printing control apparatus according to claim 2, wherein the files relating to the certain member are files posted in the group in a period for which the certain member has belonged to the group.

4. The printing control apparatus according to claim 3, wherein the period includes a period before files posted in the group become printable.

5. The printing control apparatus according to claim 3, wherein the request to print from the certain member is received by the processor after the certain member leaves the group.

6. The printing control apparatus according to claim 2, wherein the files relating to the certain member are files used by the certain member or a member associated with the certain member.

7. The printing control apparatus according to claim 2, wherein the files relating to the certain member are files used for the certain member or a member associated with the certain member.

8. The printing control apparatus according to claim 2, wherein the files relating to the certain member are files having an attribute relating to the certain member.

9. The printing control apparatus according to claim 1, wherein the displayed list is a plurality of files not relating to the certain member.

10. The printing control apparatus according to claim 9, wherein the files not relating to the certain member are files posted by a member of the group other than the certain member.

11. The printing control apparatus according to claim 1, wherein the processor is further configured to:
    transmit printing instruction information, to the terminal of the certain member, for instructing the certain member to print one of the displayed list of files, and
    upon receiving printing instruction from the certain member, select the certain file from the displayed list for printing based on the received printing instruction.

12. The printing control apparatus according to claim 11, wherein the printing instruction information includes group identification information for identifying the group and member identification information for identifying the certain member, and
    wherein the selecting the certain file from the displayed list includes selecting the certain file based on the group identification information and the member identification information.

13. The printing control apparatus according to claim 11, wherein the printing instruction information includes group identification information for identifying the group and a belonging period information indicating a period for which the certain member has belonged to the group, and
    wherein the selecting the certain file from the displayed list includes selecting the certain file based on the group identification information and the belonging period information.

14. The printing control apparatus according to claim 11, wherein the printing instruction information includes file identification information for identifying the certain file, and
    wherein the selecting the certain file from the displayed list includes selecting the certain file based on file identification information.

15. The printing control apparatus according to claim 1, wherein the certain member is a member different from a member who has added a bot of a printing server to the group.

16. The printing control apparatus according to claim 15, wherein
    the plurality of files are registered with the printing server immediately upon being posted in the group, and
    the plurality of files are converted into a printable format before being registered with the same print reservation number.

17. A non-transitory computer readable medium storing a program causing a computer to execute a process comprising:
    in response to receiving a request to print from a certain member of a group in a messaging service:
        obtaining a plurality of pieces of files posted in the group including a file that was posted in the group before the certain member has joined the group and a file that was posted after the certain member has joined the group, wherein
            the plurality of files are registered with a same print reservation number associated with the group, and
            the request to print from the certain member identifies said print reservation number;
        comparing a posting time of each of the obtained plurality of files to a joining time of the certain member at which the certain member joined the group;
        excluding files whose posting times are before the joining time of the certain member;
        displaying, on a terminal of the certain member, a list of the plurality of files after excluding the files whose posting times are before the joining time of the certain member; and
        in response to selection, by the certain member, of a certain file from the displayed list, print the certain file.

18. A printing control method to be performed by a computer, the method comprising:
    in response to receiving a request to print from a certain member of a group in a messaging service:
        obtaining a plurality of files posted in the group including a file that was posted in the group before the certain member has joined the group and a file that was posted after the certain member has joined the group, wherein
            the plurality of files are registered with a same print reservation number associated with the group, and
            the request to print from the certain member identifies said print reservation number; and
        comparing a posting time of each of the obtained plurality of files to a joining time of the certain member at which the certain member joined the group;
        excluding files whose posting times are before the joining time of the certain member;

displaying, on a terminal of the certain member, a list of the plurality of files after excluding the files whose posting times are before the joining time of the certain member; and in response to selection, by the certain member, of a certain file from the displayed list, print the certain file.

\* \* \* \* \*